(12) United States Patent
Etemad et al.

(10) Patent No.: US 7,729,616 B2
(45) Date of Patent: Jun. 1, 2010

(54) PHASE CHIP FREQUENCY-BINS OPTICAL CODE DIVISION MULTIPLE ACCESS

(75) Inventors: Shahab Etemad, Warren, NJ (US); Paul Toliver, Tinton Falls, NJ (US); Janet Lehr Jackel, Holmdel, NJ (US); Ronald Charles Menendez, Chatham, NJ (US); Stefano Galli, Morristown, NJ (US); Thomas Clyde Banwell, Madison, NJ (US); Peter Delfyett, Geneva, FL (US)

(73) Assignees: Telcordia Technologies, Inc., Piscataway, NJ (US); University of Central Florida, Orlando, FL (US)

( * ) Notice: Subject to any disclaimer, the term of this patent is extended or adjusted under 35 U.S.C. 154(b) by 1090 days.

(21) Appl. No.: 11/062,090

(22) Filed: Feb. 18, 2005

(65) Prior Publication Data
US 2007/0036553 A1    Feb. 15, 2007

(51) Int. Cl.
*H04J 4/00* (2006.01)
*H04B 10/06* (2006.01)

(52) U.S. Cl. .................. 398/77; 398/78; 398/140; 398/183; 398/188; 398/189; 398/212

(58) Field of Classification Search .............. 398/77, 398/78, 140, 183, 189, 212
See application file for complete search history.

(56) References Cited

U.S. PATENT DOCUMENTS

| 4,779,266 | A | 10/1988 | Chung et al. | |
| 4,866,699 | A | 9/1989 | Brackett et al. | |
| 5,760,941 | A * | 6/1998 | Young et al. | 398/183 |
| 6,381,053 | B1 * | 4/2002 | Fathallah et al. | 398/99 |
| 6,608,721 | B1 | 8/2003 | Turpin et al. | |
| 6,865,344 | B1 * | 3/2005 | Johnson et al. | 398/77 |
| 7,068,881 | B2 | 6/2006 | Yoo | |
| 2001/0010739 | A1 * | 8/2001 | Takiguchi et al. | 385/15 |
| 2001/0033603 | A1 * | 10/2001 | Olaker | 375/143 |
| 2002/0105705 | A1 * | 8/2002 | Turpin et al. | 359/173 |
| 2002/0186435 | A1 * | 12/2002 | Shpantzer et al. | 359/136 |
| 2003/0090767 | A1 * | 5/2003 | Yap et al. | 359/181 |

(Continued)

OTHER PUBLICATIONS

Galli et al: "DWDM-Compatible Spectrally Phase Encoded Optical CDMA", GLOBECOM 2004, vol. 3, Nov. 29-Dec. 3, 2004, pp. 1888-1894.*

(Continued)

*Primary Examiner*—Li Liu
(74) *Attorney, Agent, or Firm*—Philip J. Feig

(57) ABSTRACT

Apparatus and system for transmitting and receiving optical code division multiple access data over an optical network. The apparatus comprises a spectral phase decoder for decoding the encoded optical signal to produce a decoded signal, a time gate for temporally extracting a user signal from the decoded signal, and a demodulator that is operable to extract user data from the user signal. The system preferably comprises a source for generating a sequence of optical pulses, each optical pulse comprising a plurality of spectral lines uniformly spaced in frequency so as to define a frequency bin, a data modulator associated with a subscriber and operable to modulate the sequence of pulses using subscriber data to produce a modulated data signals and a Hadamard encoder associated with the data modulator and operable to spectrally encode the modulated data signal to produce an encoded data signal.

6 Claims, 10 Drawing Sheets

U.S. PATENT DOCUMENTS

| | | | |
|---|---|---|---|
| 2003/0156847 A1* | 8/2003 | Nishiki | 398/161 |
| 2004/0047543 A1* | 3/2004 | Hiironen et al. | 385/16 |
| 2004/0081463 A1* | 4/2004 | Kim et al. | 398/78 |
| 2004/0091262 A1* | 5/2004 | Pohjola et al. | 398/42 |
| 2004/0170439 A1* | 9/2004 | Hiironen | 398/190 |
| 2004/0208604 A1* | 10/2004 | Madsen | 398/147 |
| 2004/0213579 A1* | 10/2004 | Chew et al. | 398/183 |
| 2004/0253002 A1* | 12/2004 | Minato et al. | 398/202 |
| 2004/0264695 A1* | 12/2004 | Turpin | 380/200 |
| 2004/0264965 A1* | 12/2004 | Kobayashi et al. | 398/78 |
| 2005/0100338 A1* | 5/2005 | Yeon et al. | 398/78 |
| 2005/0226615 A1* | 10/2005 | Chu et al. | 398/78 |
| 2007/0110442 A1* | 5/2007 | Peer | 398/78 |

OTHER PUBLICATIONS

Toliver et al: "Optical Network Compatibility Demonstration of O-CDMA Based on Hyperfine Spectral Phase Coding", LEOS 2004, Nov. 7-11, 2004, vol. 2, pp. 495-496.*

Etemad: "Optical-CDMA incorporating phase coding of coherent frequency bins: concept, simulation, experiment", OFC 2004, Feb. 23-27, 2004, paper FG5.*

Z. Li et al., "Simulation of Mode-locked Ring Laser Based on Non-linear Polarization Rotation in a Semiconductor Optical Amplifier", in Proc. ICTON 2004, Warsaw, Poland, Jul. 2004, pp. 318-321.

* cited by examiner

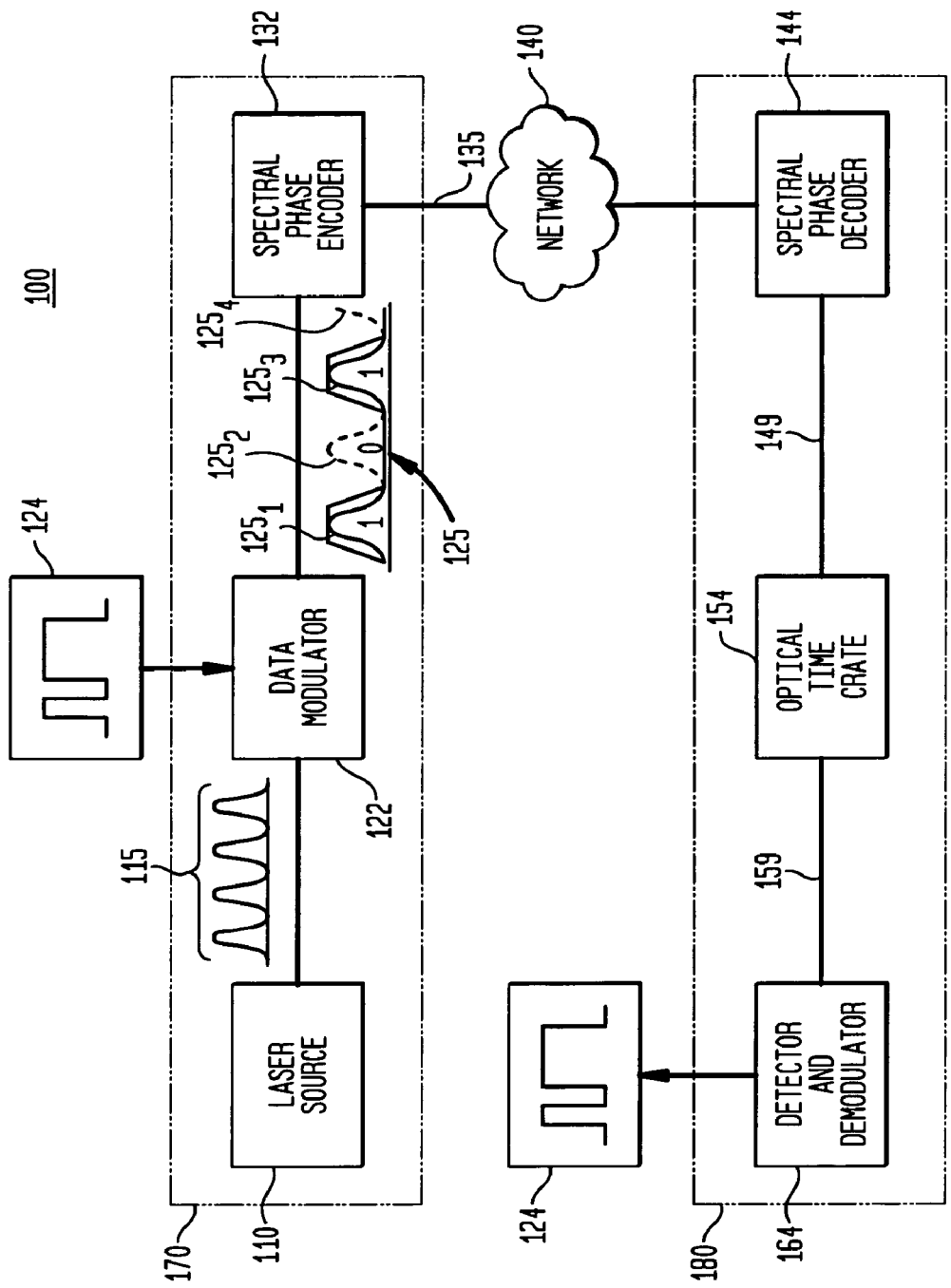

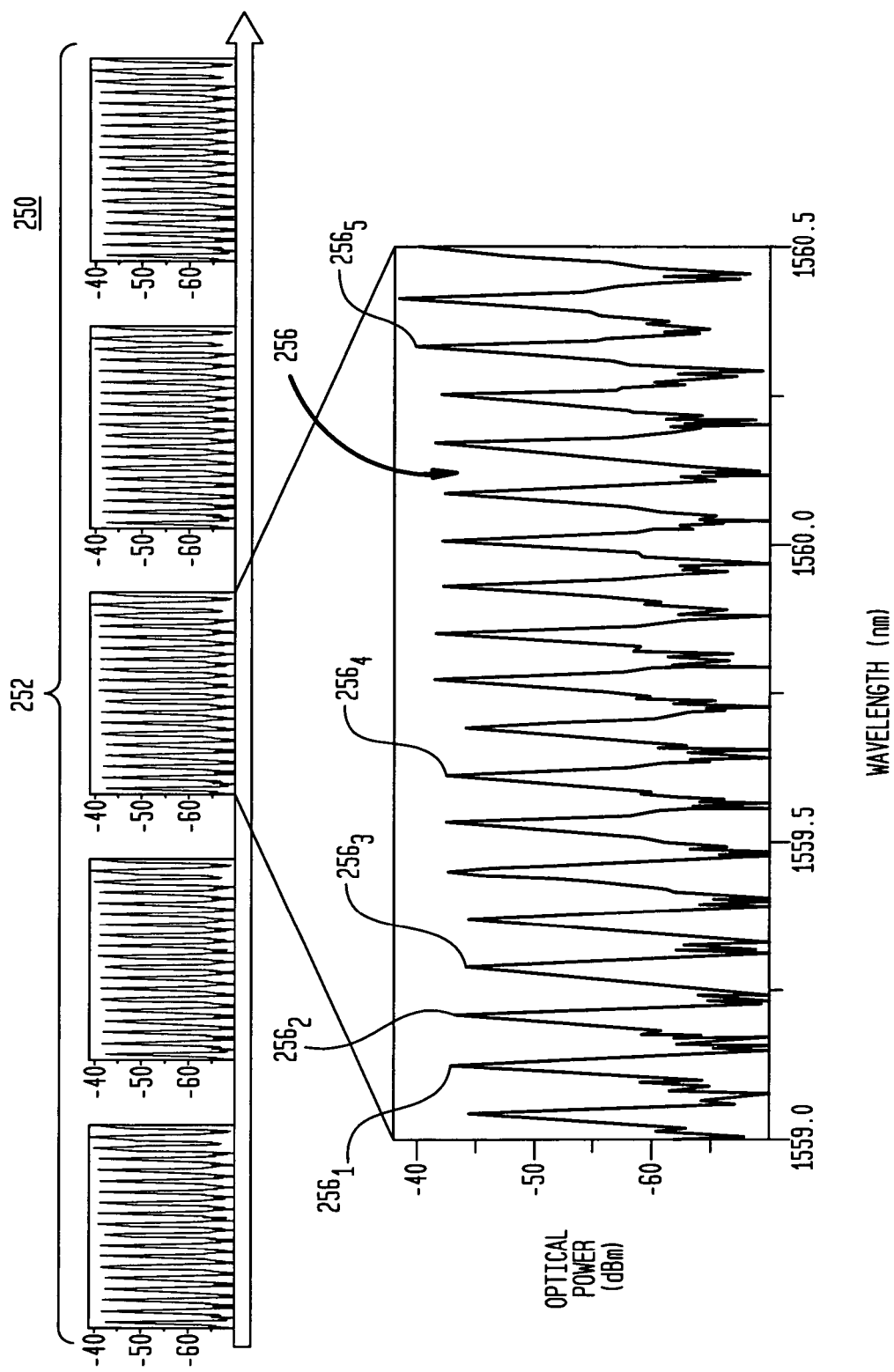

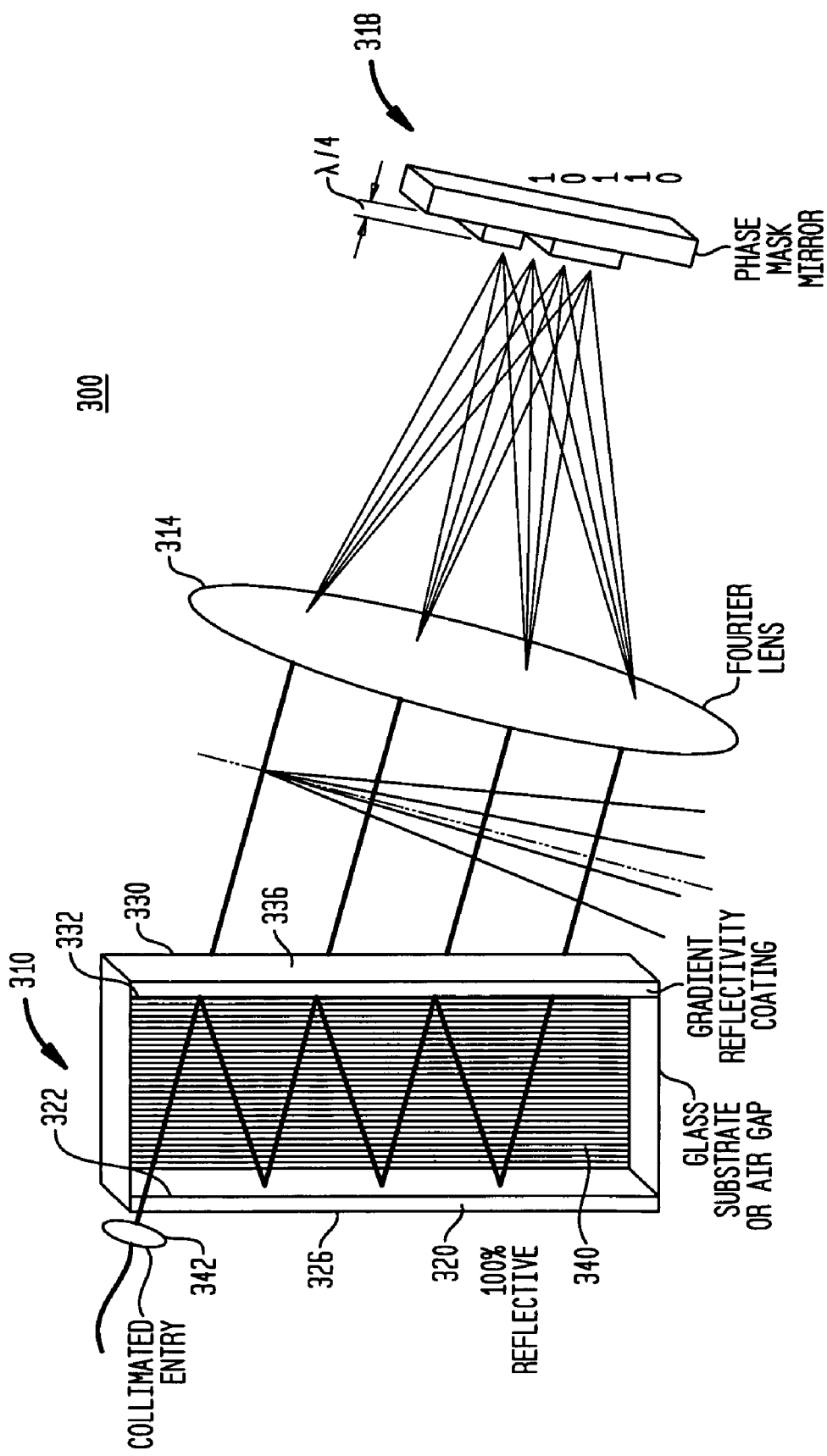

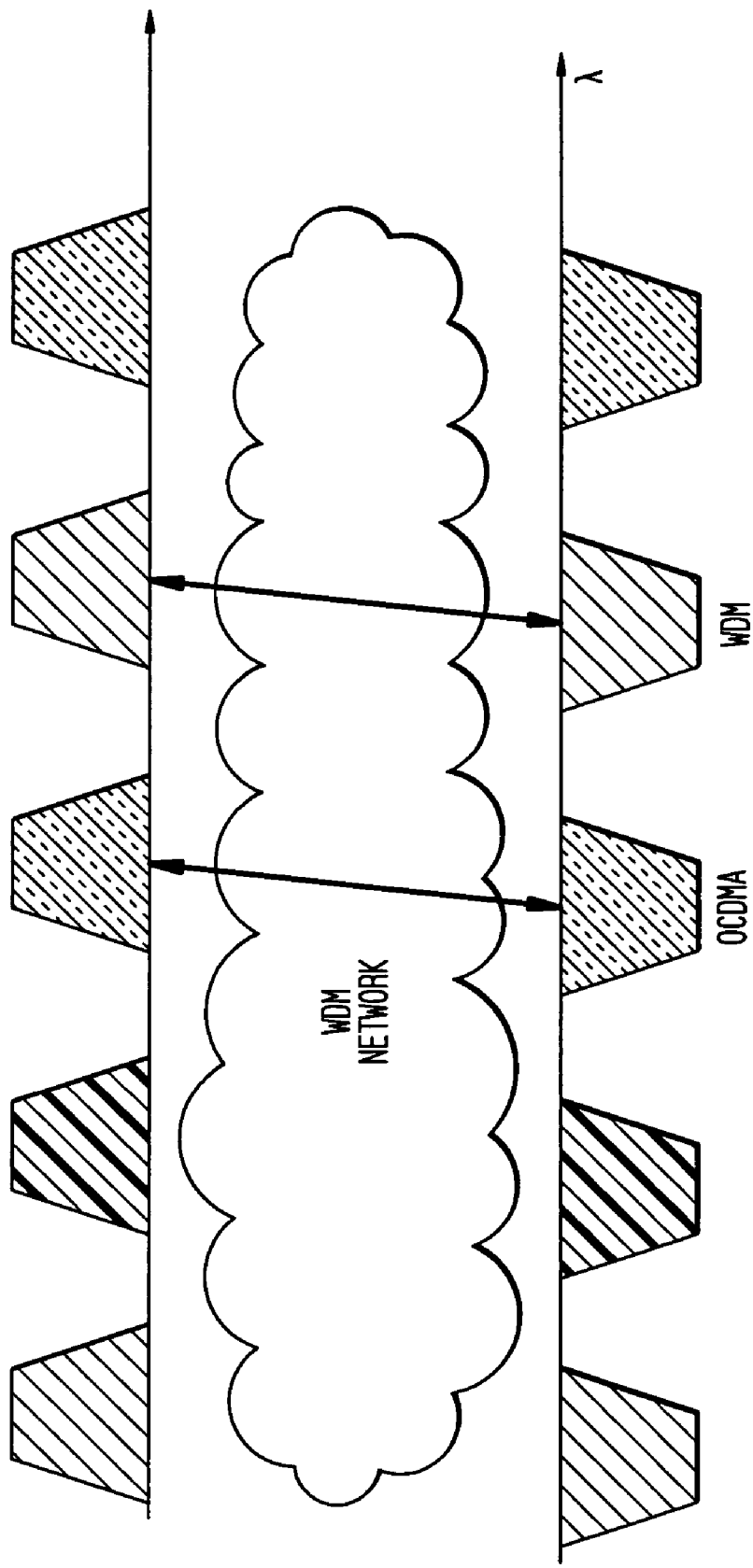

PHASE CHIP FREQUENCY-BINS OPTICAL CODE DIVISION MULTIPLE ACCESS

STATEMENT REGARDING FEDERALLY SPONSORED RESEARCH

Funding for research was partially provided by the Defense Advanced Research Projects Agency under federal contract MDA972-03-C-0078. The federal government has certain rights in this invention.

CROSS-REFERENCE TO RELATED APPLICATIONS

This application is related to U.S. application Ser. No. 11/048,394 (Telcordia APP No. 1548/TELCOR 1.0-003), filed Jan. 31, 2005 and titled "Multi-Wavelength Optical CDMA With Differential Encoding And Bipolar Differential Detection," assigned to the assignee of the present application, the disclosure of which is incorporated herein by reference.

BACKGROUND OF THE INVENTION

The present invention relates to optical communication and, more particularly, to optical code division multiple access (OCDMA) communication networks.

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band. However, FDMA and TDMA are quite limited in the number of users and/or the data rates that can be supported for a given transmission band.

In many communication architectures, code division multiple access (CDMA) has supplanted FDMA and TDMA. CDMA is a form of spread spectrum communications that enables multiple data streams or channels to share a single transmission band at the same time. The CDMA format is akin to a cocktail party in which multiple pairs of people are conversing with one another at the same time in the same room. Ordinarily, it is very difficult for one party in a conversation to hear the other party if many conversations occur simultaneously. For example, if one pair of speakers is excessively loud, their conversation will drown out the other conversations. Moreover, when different pairs of people are speaking in the same language, the dialogue from one conversation may bleed into other conversations of the same language, causing miscommunication. In general, the cumulative background noise from all the other conversations makes it harder for one party to hear the other party speaking. It is therefore desirable to find a way for everyone to communicate at the same time so that the conversation between each pair, i.e., their "signal", is clear while the "noise" from the conversations between the other pairs is minimized.

The CDMA multiplexing approach is well known and is explained in detail, e.g., in the text "CDMA: Principles of Spread Spectrum Communication," by Andrew Viterbi, published in 1995 by Addison-Wesley. Basically, in CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This modulation is equivalent to assigning a different language to each pair of speakers at a party.

During modulation, the user data is "spread" across the bandwidth of the CDMA band. That is, all of the channels are transmitted at the same time in the same frequency band. This is equivalent to all of the pairs of partygoers speaking at the same time. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread." Thus, the data is returned to approximately the size of its original bandwidth, while the noise remains spread over the much larger transmission band. The power control for each user can also help to reduce noise from other users. Power control is equivalent to lowering the volume of a loud pair of partygoers.

CDMA has been used commercially in wireless telephone ("cellular") and in other communications systems. Such cellular systems typically operate at between 800 MHz and 2 GHz, though the individual frequency bands may only be a few MHz wide. An attractive feature of cellular CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

Recently, CDMA has been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"s and logic "0"s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses. The pulses comprise Fourier components whose phases are coherently related to one another. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

Improvements in the performance of OCDMA systems is nonetheless of utility. For example, OCDMA systems that are compatible with Wavelength Division Multitplex (WDM) or Dense WDM (DWDM) systems, more spectrally efficient and less costly are needed.

SUMMARY OF THE INVENTION

An aspect of the present invention is an apparatus. The apparatus preferably comprises a spectral phase decoder for decoding the encoded optical signal to produce a decoded signal and a time gate for temporally extracting a user signal from the decoded signal. The apparatus may further desirably comprise a demodulator that is operable to extract user data from the user signal.

In accordance with this aspect of the present invention, the spectral phase decoder comprises a phase filter that is operable to conjugate the phase of a phase filter used to encode the encoded optical signal.

In addition, the encoded optical signal comprises a signal encoded using a code chosen from among a set of binary and orthogonal codes. Most preferably, the set of binary and orthogonal codes comprise a set of Hadamard codes.

Further in accordance with this aspect of the present invention, the spectral phase decoder preferably comprises a ring resonator. Most preferably, the ring resonator includes two ports, a polarization beam splitter and a polarization rotator arranged such that an optical signal that enters one of the two ports in a first polarization state exits the other port in a second polarization state.

Further in accordance with this aspect of the present invention, the decoder may comprise a planar optical circuit constructed from multiple ring resonators and phase filters.

Further still, the spectral phase decoder may desirably comprise a transparent plate, a Fourier lens and a phase mask mirror that are arranged so that the transparent plate spectrally spreads the encoded optical signal to provide multipath optical signals to the Fourier lens which projects the multipath optical signals onto the phase mask mirror, the phase mask mirror being located at the focal plane of the Fourier lens. Most preferably, the transparent plate comprises a first mirror having an inner surface and an outer surface and a second mirror having an inner surface and an outer surface, the first and second mirrors being arranged across an air gap such their inner surfaces face each other and wherein the inner surface of the first mirror is reflective and the inner surface of the second mirror is partially reflective.

Further in accordance with this aspect of the present invention, the optical time gate is desirably operative to filter multi-user interference energy that falls outside a time interval in which the user signal is located. Most preferably, the optical time gate is selected from the group consisting of a nonlinear optical loop mirror, a terahertz optical asymmetric time gate and a four-wave mixing time gate.

Further in accordance with this aspect of the present invention, the demodulator comprises an ON/OFF keyed demodulator.

In another aspect, the present invention is an optical system for transporting data. The system preferably comprises a source for generating a sequence of optical pulses, each optical pulse comprising a plurality of spectral lines uniformly spaced in frequency; a data modulator associated with a subscriber and operable to modulate the sequence of pulses using subscriber data to produce a modulated data signals; and an orthogonal encoder associated with the data modulator and operable to spectrally encode the modulated data signal to produce an encoded data signal.

In accordance with this aspect of the present invention, the system may also further desirably comprise a a matching orthogonal decoder for spectrally decoding the encoded data signal to produce a decoded data signal.

In accordance with this aspect of the present invention, the source preferably comprises a mode locked laser wherein each of the plurality of spectral lines are approximately equal in amplitude and are phase locked. Most preferably, the encoder comprises an Hadamard encoder that applies a unique spectral phase component to each of the plurality of spectral lines.

Further in accordance with this aspect of the present invention, the system may further comprise a plurality of additional modulators each respectively associated with additional subscribers and each respectively operable to modulate the sequence of pulses using data associated with the plurality of additional subscribers to produce a plurality of additional modulated data signals. Further still, the system may further desirably comprise a plurality of additional Hadamard encoders each respectively associated with one of the additional modulators and operable to spectrally encode a respective one of the plurality of additional modulated data signals to produce a plurality of additional encoded data signals. Most preferably, each of the additional Hadamard encoders associates a unique spectral phase code with each of the additional subscribers.

Further in accordance with this aspect of the present invention, the system further desirably includes a time gate coupled to the orthogonal decoder and operable to temporally extract a subscriber data signal from the decoded signal.

Another aspect of the present invention is a method comprising generating a sequence of optical pulses, each optical pulse comprising a plurality of spectral lines; modulating the sequence of optical pulses using subscriber data to produce a modulated data signal; and spectrally phase encoding the modulated data signal using a set of orthogonal codes to produce an encoded data signal.

Further in accordance with the method, modulating preferably comprises confining the modulated data signal to a bandwidth associated with one of the plurality of spectral lines associated with one of the set of orthogonal codes. Most preferably, modulating comprises In another aspect, the method may further desirably comprise spectrally phase decoding the encoded data signal; and temporally extracting a subscriber data signal from the decoded signal using an optical time gate.

BRIEF DESCRIPTION OF THE DRAWINGS

FIG. 1 illustratively depicts a system in accordance with an aspect of the present invention.

FIG. 2B is a spectral plot showing the modes or lines of a laser source in accordance with an aspect of the present invention.

FIG. 3 illustratively depicts an encoder decoder in accordance with an aspect of the present invention.

FIG. 8 is a diagram illustratively depicting an overlay of an OCDMA system onto a WDM system in accordance with an aspect of the present invention.

DETAILED DESCRIPTION

Figure 2A:
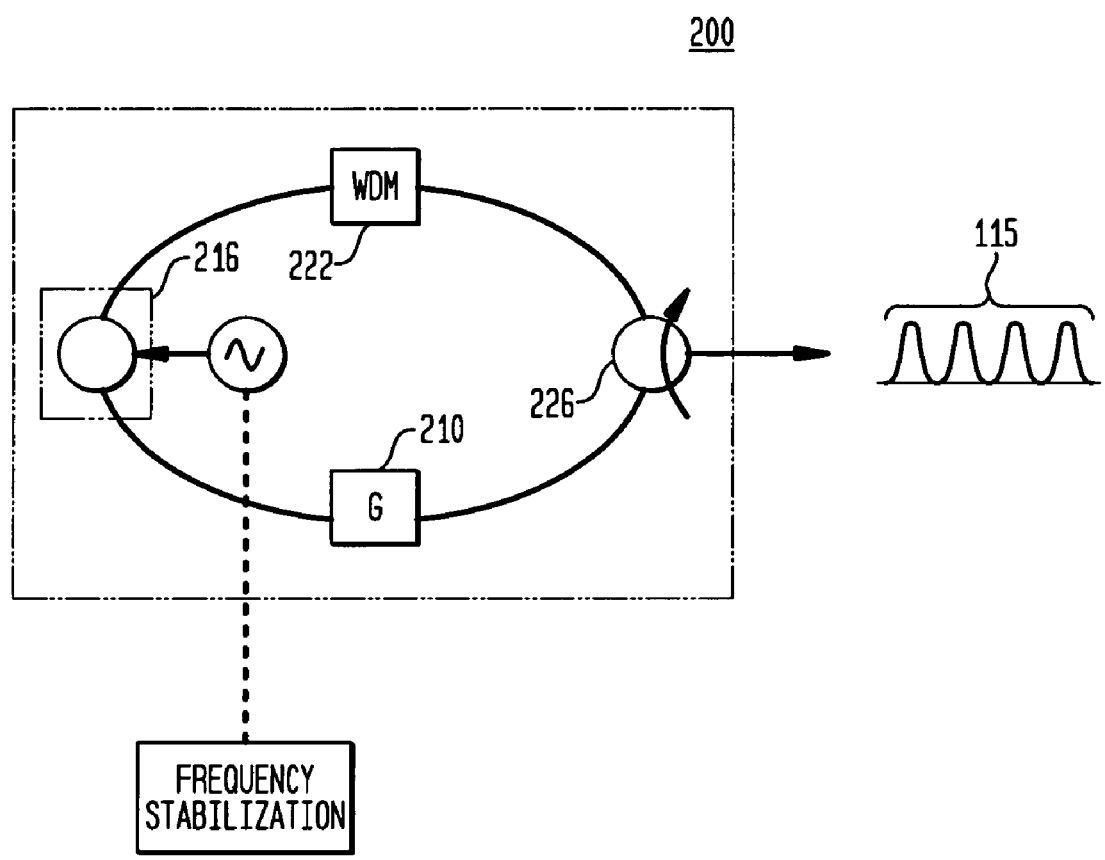
FIG. 2A illustratively depicts a source in accordance with an aspect of the present invention.

This detailed description incorporates by reference herein the disclosures of commonly assigned U.S. application Ser. No. 11/048,394, filed Jan. 31, 2005 and titled "Multi-Wavelength Optical CDMA With Differential Encoding And Bipolar Differential Detection."

FIG. 1 illustratively depicts a system 100 in accordance with an aspect of the present invention. The system comprises a laser source 110 that generates a sequence of optical pulses 115 that are fed to a data modulator 120. The data modulator 122 also receives a data stream 122 that is used to modulate the sequence of optical pulses 115. The modulation data preferably comprises a digital data stream generated by a subscriber or user station 124. In a preferred embodiment, the data modulator 122 comprises an ON/OFF keyed data modulator wherein a "1" symbol or bit in the digital data stream corresponds to the presence of an optical pulse and a "0" symbol or bit corresponds to the absence of an optical pulse. In this way, each pulse represents a bit of information. For example, a modulated stream 125 is shown where the digital data stream comprises a "1010" data sequence. As shown, each time slot with the bit "1" will result in the presence of an optical pulse ($125_1$ and $125_3$), whereas each time slot with a "0" bit indicates the absence of an optical pulse (1252 and 1254), which are shown as dashed lines to indicate their absence.

The modulated data stream 125 is then fed to a spectral phase encoder 132. As is discussed in further detail below, the spectral phase encoder 132 uses a phase mask to apply a phase code associated with a user to each optical pulse in the data stream to produce an encoded data stream 135. The phase code operates to provide a "lock" so that only a corresponding phase decoder with the appropriate "key" or phase conjugate of the phase code of the spectral phase encoder may unlock the encoded data stream. Typically, a spectral phase encoder is associated with a particular user and therefore allows only another user with the appropriate key to decode or receive information from the particular user. The information appears as noise to users that do not have the appropriate key.

The encoded data stream 135 may then be transported over a network 140, such as Wavelength Division Multiplex (WDM) network for example, to a spectral phase decoder 144 that, preferably, includes a phase mask that applies the phase conjugate of the phase code of the spectral phase encoder 132, as discussed above. The spectral phase decoder 144 provides a decoded data stream 149 to an optical time gate 150. As is discussed in detail below, the optical time gate 154 operates to reduce multiple access interference by temporally extracting only a desired user channel from among the decoded stream. The optical time gate 154 produces a user data stream 159, which is fed to a data demodulator 164. Where ON/OFF keying was employed at the transmitting end, the data demodulator 164 comprises an amplitude detector that reproduces the digital data stream 124.

In accordance with an aspect of the present invention, the laser source 110, data modulator 122 and spectral phase encoder 132 may comprise a transmitting station 170 associated with a user. The spectral phase decoder 144, optical time gate 154 and demodulator 164 may preferably comprise a receiving station 180 associated with a user.

FIG. 2A illustratively depicts a laser source 200 that may be used to generate the pulse stream 115 in accordance with an aspect of the present invention. The laser source 200 preferably comprises a mode locked laser (MLL) having a spectral content comprising a stable comb of closely spaced phase-locked frequencies. The frequency or comb spacing is determined by the pulse repetition rate of the MLL. As shown in FIG. 2A, the source 200 may comprise a ring laser that may be formed using a semiconductor optical amplifier (SOA) or erbium doped fiber amplifier (EDFA). The ring laser illustrated in FIG. 2 includes a laser cavity 210, a modulator 216, a wavelength division multiplexer (WDM) 222 and a tap point 226 for providing an output signal, which comprises optical pulses 115.

FIG. 2B illustratively depicts a frequency plot 250 of the output of a MLL in accordance with an aspect of the present invention. The spacing of the longitudinal modes or lines is equal to the pulse repetition rate of 5 GHz. As also seen in FIG. 2B, the total spectral width of the source may be limited to, for example, 80 GHz by placing an optical band pass filter in the laser cavity. The top portion 252 of FIG. 2B shows multiple windows that illustratively indicate the tunability of the source. Each line or mode 256 of the laser comprises a frequency chip or bin. FIG. 2B illustratively 16 frequency bins or chips in accordance with an aspect of the present invention.

In general, the electric field m(t) output of the MLL is a set of N equi-amplitude phase-locked laser lines:

$$m(t) = A \sum_{i=1}^{N} e^{j(2\pi f_i t + \phi)} \qquad (1)$$

where $f_i = \sim 193$ THz$+(i-1)\Delta f$ are equally spaced frequencies. Signal m(t) is a periodic signal comprising a train of pulses spaced $1/\Delta f$ seconds apart and each pulse having a width equal to $1/(N\Delta f)$ seconds. We can also express (1) as:

$$m(t) = \sum_k p(t - kT) \qquad (2)$$

where p(t) represents a pulse of duration T=1/Δf whose energy is mostly confined in the main lobe of width 1/(NΔf). With regard to FIG. 2A, N=16 and Δf is equal to 5 GHz.

Turning now to FIG. 3, there is depicted a spectral phase encoder 300 in accordance with an aspect of the present invention. The encoder 300 includes a transparent plate 310, a Fourier lens 314 and a phase mask mirror 318. The plate 310 comprises a first element 320 that includes an inner surface 322 and an outer surface 326. The first element 320 is spaced from a second element 330 that also has an inner surface 332 and an outer surface 336. The inner surface 322 of the first element provided with a coating that is substantially 100% reflective. The inner surface 332 of the second element is provided a partially reflective coating. The first and second elements 320, 330 may be separated by a glass substrate 340, as shown, or by an air gap. The arrangement of the transparent plate and Fourier lens comprise an optical demultiplexer and may comprise structure or components as described in U.S. Pat. No. 6,608,721, the disclosure of which is incorporated herein by reference.

As shown, the first element 320 and glass substrate 340 are arranged such that an opening 342 is provided at one end of the plate 310. The opening 342 provides an entry point for a beam of light to enter the cavity so that a portion of the light beam is partially reflected by the surface 332 to surface 322, thereby establishing a cavity where the input light beam is split into multiple beams that are each projected onto the Fourier lens 314. The Fourier lens 314 then projects each mode or line of each beam to a particular location in space based on the wavelength or frequency of each mode. In particular, the phase mask mirror 318 is positioned at the focal plane of the Fourier lens 314 such that each mode or line is projected to a particular location on the phase mask mirror to cause a predetermined phase shift. In this way, the phase of each line or mode of the laser source (each such line or mode comprising a frequency bin or chip) is adjusted by a predetermined amount by the phase mask mirror. The phase mask mirror 318 then reflects the phase adjusted signals back through the Fourier lens 314 to the plate 310 where the phase adjusted signals exit through opening 342 as a collimated phase adjusted beam of light.

As shown in FIG. 3, each section of the phase mask 318 is recessed at 0 or λ/4 with respect to the focal plane of the Fourier lens 314 thereby representing a 0 or π phase shift, respectively. The phase mask of FIG. 3 includes five sections which comprise a "10110" phase mask, wherein a "1" represents a phase shift of π and a "0" represents a phase shift of 0. As is discussed in further detail below, each user is assigned a unique phase mask that includes a section for each frequency bin or chip in the system. The unique phase mask corresponds to a unique code or lock that is associated with a particular user such that a receiving unit needs the appropriate code or key to decipher a message from the particular user. In addition, the encoder 300 may also be used at the receive end as a decoder.

Figure 4A:
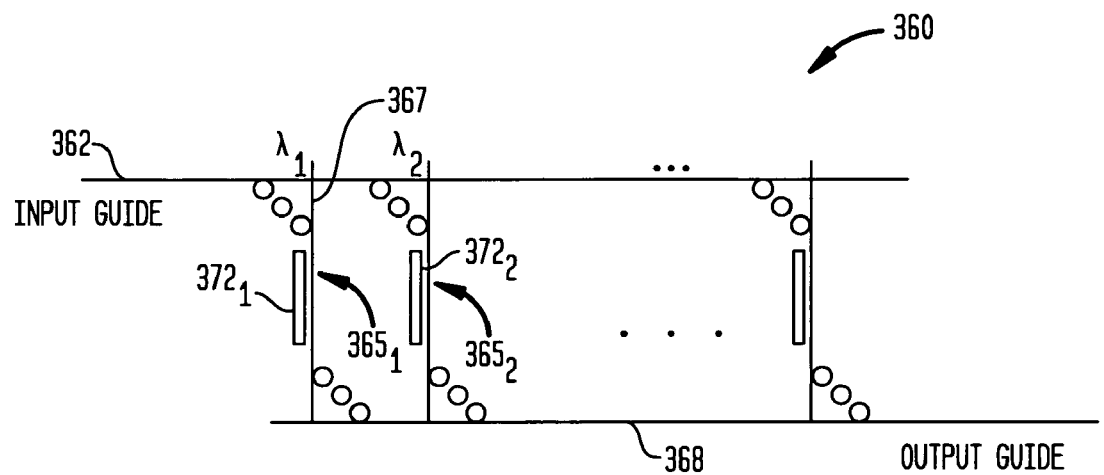
FIGS. 4A and 4B illustratively depict an encoder/decoder in accordance with an aspect of the present invention.

The encoder/decoder of FIG. 3 is typically large since it uses bulk optics. The size of such encoders/decoders typically make them susceptible to thermally induced drifts. Furthermore, the large size and complex alignment requirements may make it unlikely that the coder/decoder of FIG. 3 will be economically viable. As discussed above, spectral phase encoding consists of demultiplexing the various spectral components of a signal, shifting the phase of a portion of the spectrum based on the code and recombining the shifted components to produce the coded signal. The recombined signal no longer comprises a short optical pulse, but instead, the energy in the pulse is spread across the bit period in a pattern determined by the code. In accordance with an aspect of the present invention, we use a coder/encoder in form of an integrated photonic circuit, which uses ring resonators as wavelength selective subcomponents. FIG. 4A illustratively depicts a functional diagram of such a coder 360.

As shown in FIG. 4A, light enters from the left on the input guide 362. At a first ring resonator structure 365, subwavelength $\lambda_1$ is coupled off the guide 362 and onto the connecting guide (vertical line 367). At the bottom of vertical line 367, $\lambda_1$ is coupled onto the output guide 368 with another wavelength selective ring resonator. Each of the frequency components is coupled in the same way at the appropriate point. If all the connecting guides have the same optical length, and if the input and output guide have the same propagation constant, then all frequency components will see the same optical path length when they reach the end of the output guide. In this case, all would recombine with the same phase that they had at entry (i.e., this is equivalent to a code with all 0's or all 1's). To create a phase shift that defines a code, we use heaters on the connecting waveguides, shown here as blocks 372. The electrical connections to the heaters are not shown to avoid unnecessarily complicating the diagram. If the connecting waveguides are far enough apart, then they are sufficiently thermally isolated that the phase shifts can be applied independently. With thermal monitoring and feedback, independent phase shifts can be applied to each frequency even when the guides have some affect on each other.

A decoder typically has the same structure as an encoder, except that it may need to be polarization insensitive, since the signals may have their polarization altered in transmission through the fiber. The coder can have polarization dependence, since the initial mode-locked laser pulse is polarized. An example of a polarization independent coder is shown in FIG. 4B.

Note that each frequency passes through the same number of elements (two ring resonators for its frequency, and N−1 ring resonators that it passes through without being dropped/added) and the same optical path length, except for the phase shift that is applied thermally. Thus, each should experience the same loss. Consequently, there is no skewing of the amplitudes and the decoded pulse shape will be the same as the input to the coder. In addition, because the base path lengths are the same (except for some trimming to adjust for fabrication error) creating the correct phase relationships will typically be straightforward.

Figure 4B:
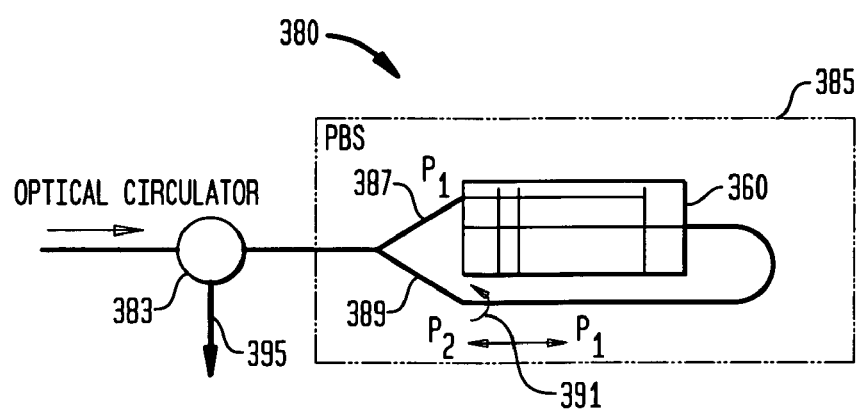

For polarization insensitivity we use the same structure at the core, but separate input polarizations, and have them pass through the coder/decoder 380 as shown in FIG. 4B.

As shown in FIG. 4B, light enters and passes through an optical circulator 383. The light is split into two polarizations using a polarization beamsplitter (PBS) 385 and one polarization follows the upper path 387 while the orthogonal polarization follows the lower path 389. On the lower path a polarization rotator 391 converts the polarizations from one mode to another orthogonal mode, e.g., $P_1$ into $P_2$ (or vice versa). The light in the upper path enters the coder structure 393 in polarization mode 1 at the point previously called the input 362, and the light in the lower path enters the coder also in polarization mode 1, but at the point previously called the output 368, traveling in the opposite direction. The light from the upper path exits the coder, passes through the polarization rotator and is converted to polarization mode 2, which then passes through the PBS 385 and is sent back to the circulator 383 from which it exits along the path shown as a vertical line 395. The light from the lower path, now in polarization mode 1, goes through the coder in the opposite direction, but experiences precisely the same phase shifts and optical path lengths as the light from the upper path. It exits the coder and is recombined in the PBS 385, and exits the circulator 383 in the same way as the light from the other path. Thus, this comprises a polarization independent component. The structures that are shown in block 385 can either be realized in fiber or can be built onto an optical waveguide. Without this polarization independent construction, it would be necessary to have a polarization sensor and a dynamic polarization rotator before the decoder. Note that in this design, path lengths are the same and the path is the same for both polarizations. The difference is that the two polarizations traverse the path in opposite directions.

Returning to FIG. 1, the encoded signal 135 is then transmitted over a network 140 to a decoder 144. In a preferred embodiment, the network 140 comprises a WDM network. In such an implementation, the OCDMA network comprises an overlay architecture that is compatible with existing WDM network technologies as is discussed in further detail below.

As discussed above, the encoded signal 135 is decoded by a spectral phase decoder 144. A spectral phase decoder 144 will typically comprise the arrangement shown in FIGS. 3 and 4, except that, in general, the decoder will apply the phase conjugate of the phase mask applied by the encoder. Note, however, and as is discussed in further detail below, that where the phase mask uses a binary coding scheme, the code at the decoder is its own complement and consequently the coder and decoder are identical.

Figure 5A:
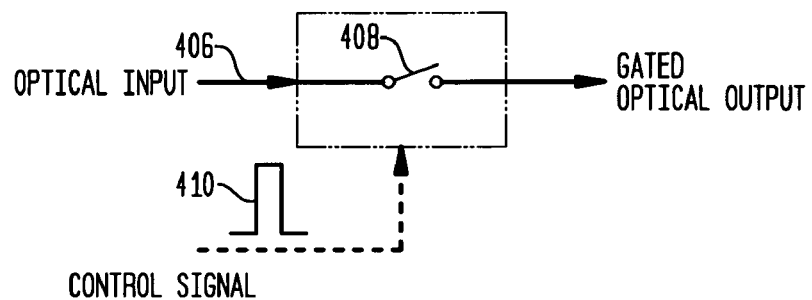
FIG. 5A illustratively depicts an optical time gate in accordance with an aspect of the present invention.

Turning now to FIG. 5A, there is shown an optical time gate 400 in accordance with an aspect of the invention. The decoded signal 149 has the sequence or train of optical pulses restored to their original position within the bit period and shape. However, the desired user signal needs to be separated or extracted from other user signals included in the decoded signal 149. In accordance with an aspect of the present invention, an optical time gate, such as optical time gate 400, may be used to reduce multiple access interference (MAI). The optical time gate 400 filters out MAI by temporally extracting only desired user signal or channel from among any other signals comprising the decoded signal 149. As shown in FIG. 5A, the optical time gate 400 includes an input port 406 and a switch 408 that is controlled by a control signal 410. The control signal 410 may be an electrical or optical signal.

Figure 5B:
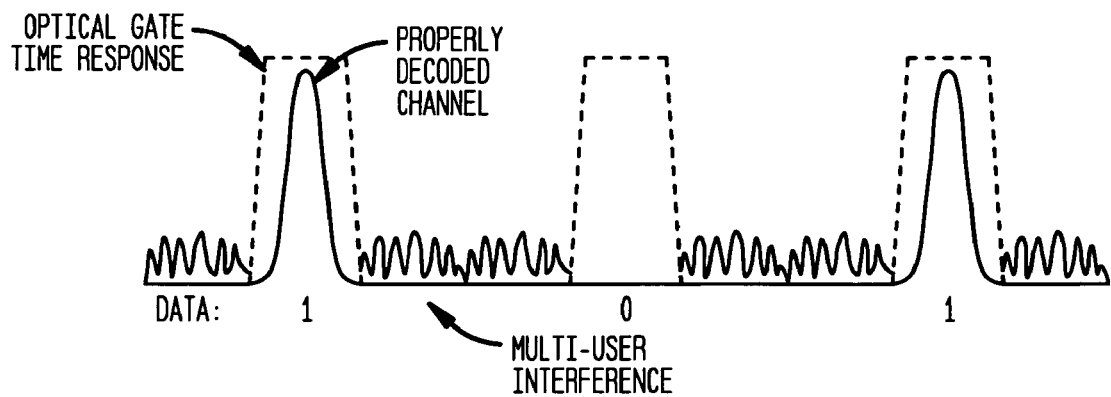
FIG. 5B illustratively depicts optical time gating for multi-user interference rejection in accordance with an aspect of the present invention.

The concept behind the application of optical time gating to extract the decoded OCDMA signal is illustrated in FIG. 5B. Through the proper selection of an appropriate code set for a synchronous coherent OCDMA system, a system may be designed such that the multi-user interference energy falls outside a time interval where the properly decoded signal pulse resides. Therefore, by optically gating the composite signal in order to provide low loss within the desired time window while at the same time providing for high extinction outside that window, one can extract only the properly decoded signal bit stream.

For the purposes of application to a coherent optical CDMA system, some of the more important performance metrics for optical gating technologies include:
Gate width (typically on the order of 10 ps or less)
Gate repetition rate (comparable to data rate, typically>1 GHz or higher)
Gate extinction rate (depends upon number of users but typically 10-20 dB)
Data pulse energy levels and dynamic range
Gating control/clock pulse energy levels and dynamic range As a result of these performance requirements, relatively high-speed optical processing techniques must typically be employed, such as those used for all-optical demultiplexing. Although there are a wide variety of options, some of the technologies that have been demonstrated specifically for coherent OCDMA systems include:
Nonlinear interferometers
Four-wave mixing (FWM) techniques Both optical fiber-based and semiconductor optical amplifier (SOA)-based approaches to these techniques are possible.

Fiber-Based Nonlinear Interferometers for Optical Time Gating

Figure 5C:
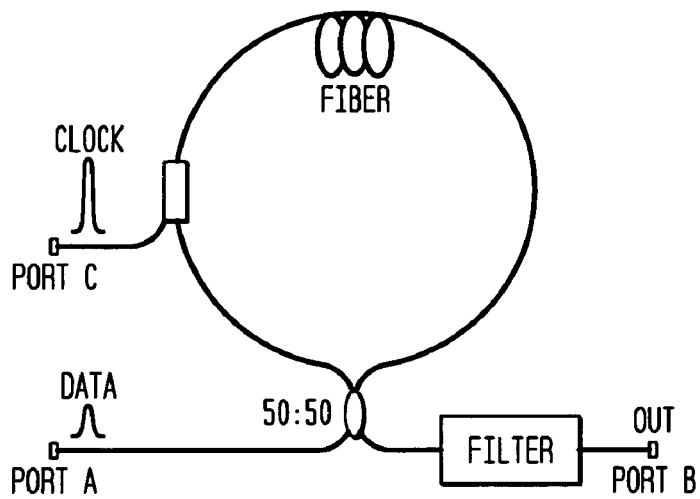
FIG. 5C illustratively depicts a non-linear optical loop mirror time gate in accordance with an aspect of the present invention.

By using an optical clock pulse in order to alter the effective phase shift through one arm of an interferometer, one can construct an all-optical gate. The phase changed can be accomplished through a distributed medium, such as nonlinear propagation through a length of optical fiber, or it can be a concentrated nonlinearity, such as can be accomplished with a semiconductor optical amplifier (SOA). Since interferometers generally require stabilization for proper operation, a common approach for fiber-based nonlinear interferometers, which generally require long lengths of fiber and therefore path lengths can drift with environmental conditions, is the nonlinear optical loop mirror (NOLM). With reference to FIG. 5C, the NOLM is built in a Sagnac interferometer configuration, which by its construction is self-stabilizing.

The operation of the NOLM can be described as follows, assuming for simplicity that the input signal is a single optical pulse. The incoming signal, input at Port A, is split into two counter propagating pulse replicas at a 50:50 fiber coupler. When the clock pulse, which can be injected at Port C, is not present, the low amplitude data pulses simply counterpropagate around the loop and recombine at the coupler. The interference condition is such that signals interfere destructively at the output port B, but interfere constructively at the original input port A, thereby reflecting the data pulse. On the other hand, by injecting a large amplitude clock signal that is of a close but distinguishable wavelength relative to the data pulse wavelength, it is possible to overlap the clock pulse with the clockwise propagating data pulse and introduce a nonlinear phase shift of $\pi$. In this case, the interference condition is altered such that the data pulse now exits at port B. An optical bandpass filter at Port B suppresses the remaining clock signal, leaving only the desired gated data pulse. The width of the time gating window for the NOLM is defined by the overlap between the clock and co-propagating data pulse. The first NOLMs that were constructed required very long dispersion-shifted fibers (>1 km) to obtain the required nonlinear phase shift; however, recent developments in highly nonlinear fibers have allowed for a reduction in fiber length to approximately 100 meters or less. In conjunction with optical thresholding, the NOLM optical time gate has been successfully applied to an implementation of phase-coded OCDMA system.

SOA-Based Nonlinear Interferometers for Optical Time Gating

Figure 5D:
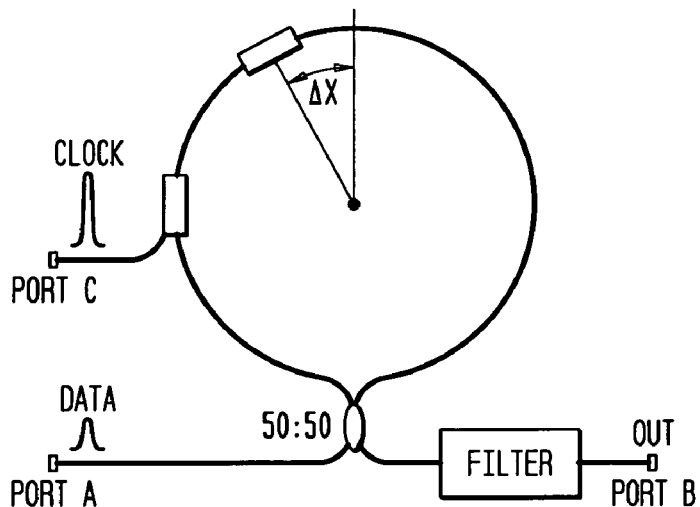
FIG. 5D illustratively depicts a terahertz optical asymmetric time gate in accordance with an aspect of the present invention.

The nonlinear phase change required in the NOLM can be accomplished by other means, such the use of as a semiconductor optical amplifier (SOA), allowing for the potential of device integration. An interferometric architecture similar to the NOLM can be used, as shown in FIG. 5D. When the SOA is offset from the center of loop by Δx, the device is referred to as the terahertz optical asymmetric demultiplexer or TOAD.

Similar to the NOLM, when the clock pulse is not present, incoming data pulses reflect from the TOAD. By injecting a clock pulse, which is typically chosen to be on the order of 10 dB larger in amplitude than the data pulse intensity, gating can occur. The clock pulse saturates the SOA, thereby changing its effective index. The clock pulse, which travels only in the clockwise direction, is injected following the clockwise propagating data pulse to give the clockwise data pulse the opportunity to propagate through the SOA before the clock pulse saturates the SOA index. Since the SOA slowly recovers on the time scale of hundreds of picoseconds, counter propagating data pulses that arrive immediately after the clock pulse event has occurred see the SOA in approximately the same relative state and do not experience a differential phase shift. The temporal duration of the gating window is set by the offset of the SOA, Δx, from the center of the loop. As the offset is reduced, the gating window width decreases until the actual length of the SOA needs to be taken into account. The nominal gate width is related to the offset by $$\Delta t_{gate} = 2\Delta x/c_{fiber}$$

where $c_{fiber}$ is the speed of light in fiber. Gating windows as short as 1.6 picoseconds have been demonstrated experimentally using a TOAD. The TOAD optical time gate has been successfully applied to an implementation of SPC-OCDMA.

Four Wave Mixing (FWM) Optical Time Gating

Figure 5E:
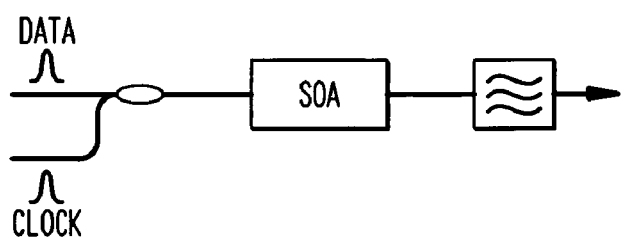
FIG. 5E illustratively depicts an optical time gate using four-wave mixing in accordance with an aspect of the present invention.

Another approach to optical time gating is through the use of four wave mixing (FWM), e.g., see FIG. 5E. FWM is a third-order nonlinearity, similar to intermodulation distortion in the electrical domain. In FWM, the nonlinear beating between the data signal and a control signal at a different wavelength generates new optical tones as sidebands. FWM-based gating can be accomplished in optical fiber or in waveguide devices such as semiconductor optical amplifiers (SOAs).

In SOAs, FWM occurs through carrier density modulation. Two co-polarized optical signals are coupled into the SOA. One is the control signal at frequency $f_c$ and typically has a much higher intensity than the other input signal (data) to be wavelength converted, which is at frequency $f_d$. The two co-propagating signals mix and, through carrier density modulation, form an index grating off which signals can be scattered. The scattering of the control signal from this grating generates two waves, one at the data frequency and one at a new frequency, $f_{converted} = 2f_c - f_d$. This is the useful wavelength-converted signal. In addition, data signal scattering also generates two much weaker waves, one at the control frequency and one at a new frequency, $f_{satellite} = 2f_c - f_d$. This is called the satellite wave and is generally not used.

By injecting a short optical control pulse along with the incoming OCDMA signal into the SOA as shown in FIG. 5E, it is possible to create an optical time gate by filtering out the resulting wavelength converted signal. The clock pulse is temporally aligned to the correct position relative to the desired OCDMA pulse, and an optical bandpass filter is placed at the output of the SOA in order to extract the FWM signal only. The FWM optical time gate has been successfully applied to an implementation of TPC-OCDMA.

Returning to FIG. 1, the signal 159 from the optical time gate, such as time gate 400, is then supplied to data detector and demodulator block 164. Where the data modulation was done using ON/OFF keying the data and demodulator block may comprise an amplitude demodulator that reproduces the subscriber data. In this regard, any known amplitude modulator may be employed to perform this task.

Figure 6:
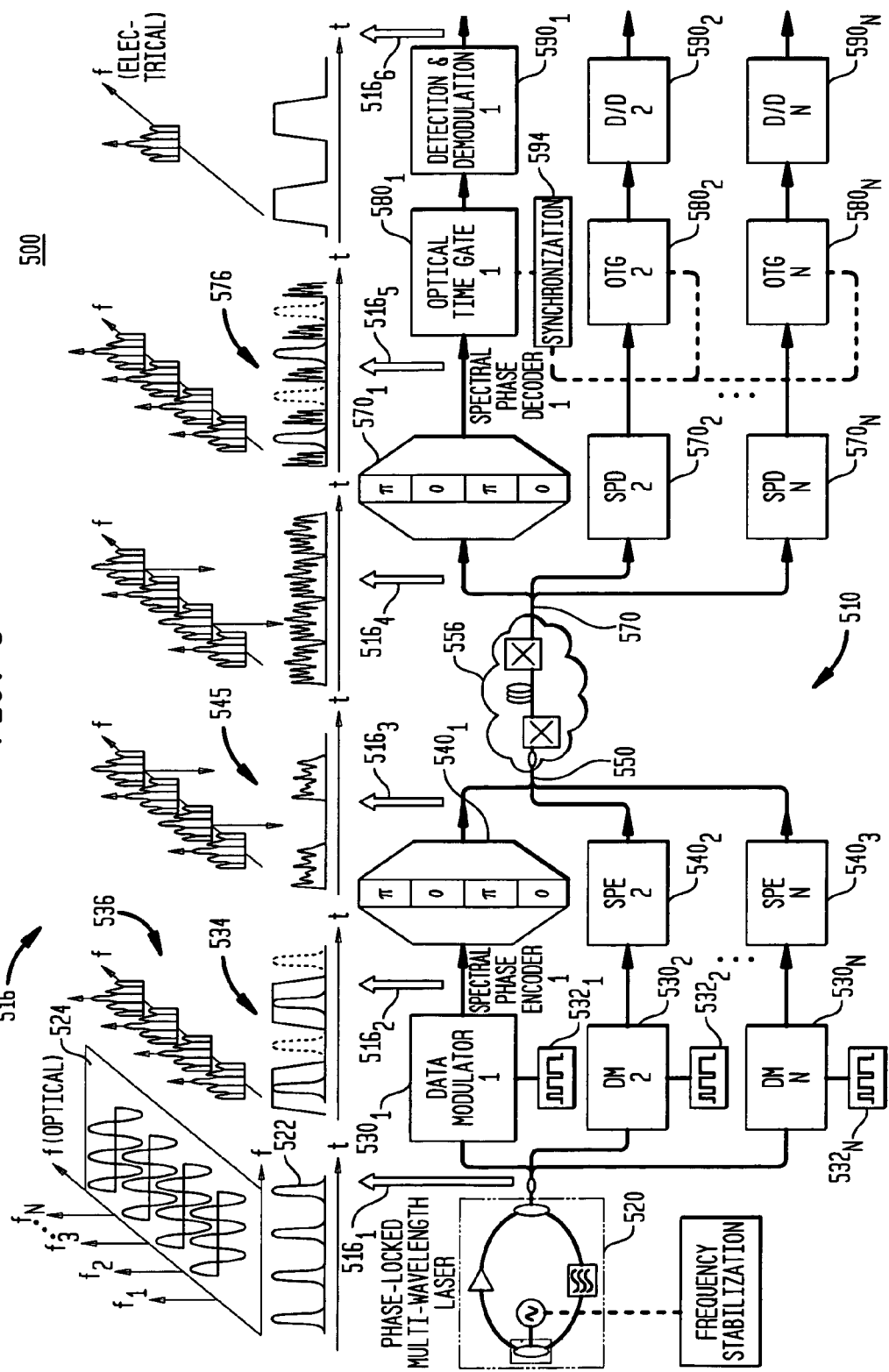
FIG. 6 illustratively depicts a system in accordance with an aspect of the present invention.

Turning now to FIG. 6, there is shown an example of a multi-user OCDMA system 500 in accordance with an aspect of the present invention. In addition to illustrating and overall system architecture 510, FIG. 6 also includes a diagram 516 that depicts signal flows through the system in the time and frequency domain. In particular, the spectrum and temporal intensity of the optical source 520 is identified by arrow $516_1$; after ON/OFF data modulation by arrow $516_2$; after phase encoding by arrow $516_3$; after mixing all users by arrow $516_4$; after the decoder of the first user by arrow $516_5$; and after time gating and optical-to-electrical (O/E) conversion by arrow $516_6$.

The optical source 520 comprises a phase-locked multi-wavelength laser with an output spectrum as shown in FIG. 2B. In accordance with this aspect of the present invention, sixteen lines in the output spectrum (see lines $256_1$ though $256_{16}$ in FIG. 2B) comprising sixteen frequency bins or chips are used to communicate user data across the system 500. As FIG. 6 shows via arrow $516_1$, a train or sequence of pulses 522 are generated by the source 520. The spectral content of each pulse is depicted in the frequency plots 524. The electric field m(t) for the output of the source may be expressed as shown above in equations (1) and (2). Therefore, in accordance with the sample network of FIG. 6, N=16 and □f=16 GHz as those variables are used in equations (1) and (2). In the practical sense, the total spectral width of the source's output is limited to a total spectral width of 80 GHz, which results in each pulse having a width of approximately 12.5 picoseconds (ps).

The output signal 522 is provided to each of the data modulators $530_1$ through $530_N$. In keeping with the present example N=16. As such, the system preferably includes 16 users or subscribers that each provides data $532_1$ through $532_N$ that is used to respectively modulate the pulse train or output signal 522. In the system of FIG. 6, the data modulators 530 operate to provide ON/OFF keying resulting in time-domain signal 534. In the time domain signal 534, the pulses with a solid outline indicate a "1" symbol or bit and the pulses with dotted outline represent a "0" symbol or bit, as previously discussed. The spectral content of such a signal is shown in frequency plot 536.

Each of the modulated optical pulse signals are then fed to respective spectral phase encoders $540_1$ through $540_N$ as shown. Encoding consists of separating each of these frequency bins ($256_1$, $256_2$, etc.), shifting its phase, in this case by 0 or π, as prescribed by the choice of code, and recombining the frequency bins to produce the coded signal. When the relative phases of the frequencies are shifted, the set of frequencies is unaltered, but their recombination results in a different temporal pattern, e.g., a pulse shifted to a different part of the bit period, multiple pulses within the bit period, or noise-like distribution of optical power. Each OCDMA code is desirably defined by a unique choice of phase shifts. Preferably, a set of codes is chosen that makes efficient use of the spectrum within the window, and that can also be separated from each other with acceptable error rates, even when a maximum number of codes occupy the window.

For the system 500 we chose the set of Hadamard codes, which are orthogonal and binary. This choice is desirable it that is can achieve relatively high spectral efficiency with minimal multi-user interference (MUI). In accordance with an aspect of the present invention, this coding schemes offers orthogonally in the sense that MUI is zero at the time that the decoded signal is maximum. The number of orthogonal codes is equal to the number frequency bins; hence, relatively high spectral efficiency is possible. Binary Hadamard codes are converted to phase codes by assigning to +1's and −1's phase shifts of 0 and π, respectively. To encode data, which contains a spread of frequencies, as opposed to the unmodulated pulse stream, which contains only the initial comb of frequencies produced by the MLL, it is preferable to define frequency bins around the center frequencies. Encoding data then consists of applying the phase shift associated with a frequency to the entire bin. The output of the phase encoder is then a signal obtained by summing the phase-shifted frequency components of the modulated signal, or equivalently, by convolving the modulated optical signal at the input of the phase encoder with the inverse Fourier transform of the phase code.

Applying any of these orthogonal codes (except for the case of Code 1, which leaves all phases unchanged) results in a temporal pattern which has zero optical power at the instant in time where the initial pulse would have had its maximum power. Although this choice of orthogonal codes implies synchronicity as a system requirement, since desynchronization will move unwanted optical power into the desired signal's time slot, careful code selection allows some relaxation of this requirement. For example, simulations indicate that for four simultaneous users transmitting at 2.5 Gb/s and using a suitably chosen set of four codes among the set 16 Hadamard codes of length 16, up to 15 ps of relative delay can be tolerated with a power penalty within 1 dB at a BER of $10^{-9}$. Better resiliency to asynchronism may be achieved by using multiphase codes.

Phase coding of the individual spectral components requires a demultiplexer with sufficient resolution and path-length stability and a means of shifting phases independently for each frequency. In accordance with an aspect of the present invention the coder/decoder of FIG. 3 was used to encode the signal using a set of Hadamard codes. As previously discussed, the coder/decoder of FIG. 3 is based on a modified reflective geometry optical demultiplexer and which is described in the '721 patent. FIG. 6 shows the spectral response of the coder for codes 9, 12, 14, and 15, from the Hadamard-16 code set, as measured using a broadband source; the phase shifts are shown below the spectrum. The encoder used has a free spectral range of 100 GHz and a resolution of ~1 GHz. As FIG. 3 shows, all MLL lines are spectrally spread by the multipath glass substrate and imaged on the focal plane, from which they are reflected back to an output fiber. A phase mask at the focal plane shifts each line by an amount determined by a particular OCDMA code. The phase mask contains 16 sections representing the 16 frequency bins, each section recessed at 0 or λ/4 with respect to the focal plane representing 0 or π phase shift, respectively. Because of the finite spot size of the image at the focal plane, the effective bandwidth of the frequency bin is less than the bin spacing.

In its idealized form, the encoder for user i acts as a phase-mask filter with frequency response $E^{(i)}(f)$:

$$E^{(i)}(f) = \sum_{j=1}^{N} c_j^{(i)} \operatorname{Re} ct_{\Delta f}(f - f_j) \quad (3)$$

where $c_j^{(i)}$ are complex symbols indicating the j-th ($1 \leq j \leq N$) element of the i-th code $\underline{c}^{(i)}$ ($1 \leq i \leq M$), and the function $\operatorname{Rect}_W$(f) denotes the rectangle function of unitary amplitude and width W defined as:

$$\operatorname{Re} ct_W(f) = \begin{cases} 1, & |f| < W/2 \\ 0, & \text{otherwise} \end{cases} \quad (4)$$

Although in principle the elements of code $\underline{c}^{(i)}$ can take any complex value, the phase mask currently employed allows only for unitary amplitude and binary phase values:

$$c_j^{(i)} = e^{j\alpha_j^{(i)}}, \text{ with } \alpha_j^{(i)} \in \{0, \pi\} \Rightarrow c_j^{(i)} \in \{-1, 1\} \quad (5)$$

Ideally, all the spectral components of the unencoded signal would emerge from the encoder unchanged in amplitude but, in some cases, flipped in phase. Due to the finite diffraction-limited spot size of the imaging optics, a spectral component situated at a phase transition boundary (or bin edge) will overlap two values of $c_j^{(i)}$ and effectively be cancelled.

Figure 7:
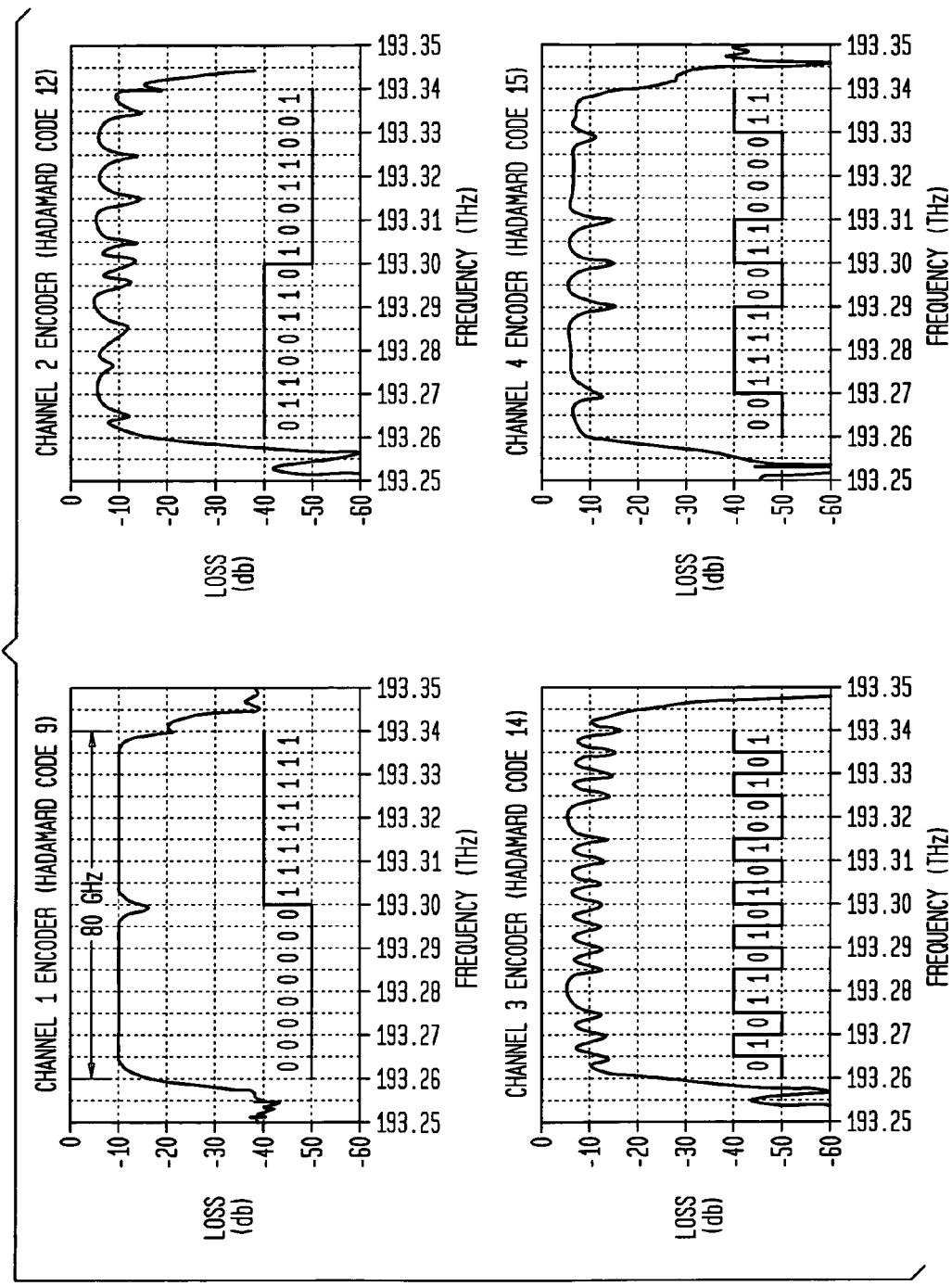
FIG. 7 illustratively depicts the transfer functions of four Hadamard encoded signals in accordance with an aspect of the present invention.

The bin edges are shown as sharp boundaries in FIG. 7. The sharp dips in FIG. 7 corresponds to boundaries between two bins with different phase shifts where destructive interference occurs between the two oppositely phased halves of the light spot. The resolution of the OSA (0.01 nm, or approximately 1.245 GHz) reduces the apparent depth of these dips. Where adjacent bins have the same phase, there is no dip in the spectrum. This coder provides stable phase shifts; while thermal dimensional changes can shift optical paths, the relative path lengths for adjacent frequencies is unaltered.

This passive structure imposes no intrinsic power loss; although the current implementation has 5 dB loss, this can be reduced. As the number of bins increases there is no intrinsic increase in loss, and hence this approach to coding has better scalability than time domain approaches such as Fast Frequency Hopping. The filter bandwidth narrowing affects the ability of the coder to process data, as opposed to an unmodulated pulse stream. When the coded signal carries data the entire bandwidth of the modulated signal of a given MLL line must fit within the frequency bin as physically defined by the geometry of the phase encoder's focal plane. Simple on-off keying at rates equal to the bin spacing (5 GHz) spreads the frequency into the unusable region between bins; thus we need a modulation scheme with adequate bandwidth compression to ensure proper transmission. This is because the use of binary codes causes destructive interference at the [0,π] boundaries. On-off key modulation at 2.5 Gb/s, using two pulses per bit from a MLL running at a pulse-repetition rate of 5 GHz satisfies this physical restriction. Alternative approaches using duo-binary or single sideband modulation for bandwidth compression will also ensure that the spectral constituents of the data-modulated signal stay within their respective frequency bins even at a data rate of 5 Gb/s. In addition, other modulation formats such as multi-pulse ON/OFF keyed modulation (e.g., two or more optical pulses per data bit) and multi-phase/multi-amplitude modulation (e.g., DPSK, QPSK, QAM and higher-order amplitude/phase modulation) may be used. When multiphase codes that do not exhibit 0-π phase transitions are used, the amplitude dips at the bin edges are reduced.

Due to the bin edge effects in the phase mask, the OOK (ON/OFF Keying) modulation rate is preferably chosen so that the spectrum broadening of each of the N spectral lines is confined to Δf/2 Hz. OOK modulation at a rate of $R_b=\Delta f/2$ bits/sec that uses multiple pulses from the MLL to represent a single bit satisfies this physical restriction. As an alternative, using duobinary encoding and then modulating at the full rate $R_b=\Delta f$ bits/sec ensures that the spectral constituents of the data-modulated signal stay within their respective $\Delta f$-wide frequency bins. In principle, if no amplitude bin-edge effect were present, full rate modulation would be possible even without line coding. Therefore, after modulation the temporal expression of the signal pertaining to the i-th user can be written as follows:

$$b^{(i)}(t) = \sum_k a_k^{(i)} p(t-kT) \qquad (6)$$

where $\alpha_k^{(i)} \in \{0,1\}$ is the sequence of information bits of user i. After phase encoding, we obtain:

$$s^{(i)}(t) = b^{(i)}(t) * e^{(i)}(t) = \sum_k a_k^{(i)} q^{(i)}(t-kT) \qquad (7)$$

where $e^{(i)}(t)=FT^{-1}\{E^{(i)}(f)\}$ is the impulse response of the spectral phase encoder $E^{(i)}(f)$ as defined above; $FT^1$ is the Inverse Fourier Transform (IFT) operator; $q^{(i)}(t)=p(t)*e^{(i)}(t)$ represents the pulse shape of user i after encoding. If we neglect the effects of the pulse output by the MLL, the shape of the pulse is governed by the phase mask.

As shown in FIG. 6, the effect of phase encoding is to spread in time, as shown by plot 545, the MLL narrow pulses of width 1/(N$\Delta$f) seconds across the whole pulse interval. Therefore, the proposed phase encoded OCDMA can be considered as the dual version of conventional direct sequence CDMA (DS-CDMA) based on frequency spreading.

The encoded N user signals are combined 550 prior to transmission over the fiber link and through network 556. The network 556 preferably comprises a Wavelength Division Multiplex (WDM) network that allows the signals of the system 500 to be transported transparently to the other signals that are normally carried by the WDM network. In that regard, the system 500 advantageously uses a relatively small and tunable window, which is compatible with WDM systems that are currently deployed. FIG. 8 illustratively depicts how an OCDMA system in accordance with the various aspects of the present invention may be overlaid on such a network. Note, however, any other optical network may be used in accordance with this aspect of the present invention if a tunable source is used. As FIG. 8 shows, the OCDMA signals may be multiplexed into the WDM channel.

Returning to FIG. 6, after the encoded signals traverse the network 556, they are split 570 and provided to a plurality of matching decoders 570. In particular, decoding may be accomplished by using a matched, complementary code; for the binary codes used here, the code is its own complement and consequently the coder and decoder are identical. The decoded signal has the pulses restored to their original position within the bit period and restores the original pulse shape. Decoding using an incorrect decoder results in a temporal pattern that again has zero optical power at the center of the bit period and the majority of the energy for that pulse is pushed outside the time interval where the desired pulse lies.

Assuming ideal fiber propagation, discrimination of the i-th user is performed using a decoding filter $d^{(i)}(t)$ at the receiver matched to the encoder filter only (single user matched filtering). In general, this may be achieved by employing at the receiver side a decoder equal to the conjugate of the phase mask used at the transmitter side:

$$y^{(i)}(t)=x(t)*d^{(i)}(t) \qquad (9)$$

where $d^{(i)}(t)$ is the impulse response of the matched filter $$d^{(i)}(t)=e^{*(i)}(-t) \Leftrightarrow D^{(i)}(f)=E^{*(i)}(f) \qquad (10)$$

The output of the filter matched to the desired user i can be expressed as follows (assuming $\tau^{(i)}=0$):

$$y^{(i)}(t) = b^{(i)}(t)*AC_i(t) + \sum_{j=1, j\neq i}^{M} b^{(j)} * CC_{j,i}(t-\tau^{(j)}) \qquad (11)$$

where we have defined as $AC_i(t)=e^{(i)}(t)*e^{*(i)}(-t)$ and as $CC_{ji}(t)=e^{(j)}(t)*e^{*(i)}(-t)$ the autocorrelations (ACs) and the cross-correlations (CCs) of the impulse responses of the phase masks, respectively. The ACs and CCs are a function of the IFT of the sequences used as phase masks. As opposed to the case of conventional CDMA based on DS spreading, correlations are between the IFT of codes, not between the codes themselves. The effect of a matched phase decoder is to restore the original narrow pulses of width 1/(N$\Delta$f) seconds that were originally spread in time by the phase encoder (see plot 576). The effect of a mismatched phase decoder is to turn interfering signals into a noise-like signal. When orthogonal codes are employed, as opposed to conventional OCDMA, true orthogonality is achieved here and no Multiple Access Interference (MAI) is present at the ideal sampling time.

As discussed above, the signal from the phase decoder 570 is then be further processed by an optical time gate 580 and demodulator 590 to reproduce the user or subscriber data signal. As also seen in FIG. 6, a synchronization block 494 is coupled to each of the optical time gates 580. The synchronization block 594 supplies a control or clock signal that closes the time gate at the proper time interval as is discussed above in relation to FIG. 5.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for receiving a plurality of mutually orthogonal, spectrally phase encoded optical signals which simultaneously occupy the same optical frequency domain, in which each encoded optical signal comprises a plurality of uniformly spaced spectral lines, all of which are modulated with data associated with each user of a plurality of users, and the modulated signals are encoded by imposing predetermined relative phase shifts between spectral lines according to the code assigned to each user, comprising:
   a spectral phase decoder for decoding a selected encoded optical signal to produce a decoded signal that occupies a finite sampling interval while at the same time nulling the optical power of the other encoded optical signals during the sampling time;
   an optical time gate for temporally extracting the selected optical signal and rejecting other interfering optical signals, all of which occupy the same frequency domain; and
   a demodulator and detector that is operable to extract user data from the selected optical signal;
   wherein the spectral phase decoder separates the individual spectral components of the signal, individually shifts the phase of each of the spectral components and coherently recombines the frequency components, so that the decoder is operable to conjugate the phase code used to encode the encoded optical signal; and wherein the spectral phase decoder comprises a plurality of high-resolution, integrated optical structures each of which separates an individual spectral component, a plurality of phase shifters operable to conjugate the phase code used to encode the encoded optical signals, and a matched plurality of integrated optical structures for coherently recombining the spectral components.

2. The apparatus of claim 1 wherein the integrated optical structures comprise ring resonators.

3. The apparatus of claim 1 wherein the spectral phase decoders are individually adjustable to any of the codes.

4. The apparatus of claim 3 wherein the thermally induced phase changes are used in the optical paths.

5. The apparatus of claim 1, wherein the integrated decoder is polarization independent.

6. An apparatus for receiving a desired encoded optical signal comprising equally spaced coherent phase-locked spectral lines in the presence of other differently and orthogonally encoded synchronous, co-polarized optical signals which occupy the same wavelength channel and bit period, comprising:

a spectral phase decoder comprising a means for individually phase shifting each of the equally spaced, coherent phase-locked spectral lines of the encoded optical signal with respect to the other spectral lines in accordance with a predetermined code which code is one of a set of more than two mutually orthogonal codes, for decoding the encoded optical signal to produce a decoded signal in which the desired encoded optical signal is reconstituted and occupies a small part of the bit period, and the other differently encoded signals have minimal optical power in that part of the bit period;

a synchronous optical time gate for temporally extracting the desired coded signal from the decoded composite signal by synchronously selecting only the portion of the bit period in which the desired signal resides; and a demodulator that is operable to extract user data from the user desired coded signal;

wherein the spectral phase decoder comprises a plurality of ring resonators each of which selects one of the spectral components which constitutes the optical signal, and which individually couple each of the spectral components from an input waveguide to an output waveguide and a set of optical phase shifters, each of which operates to shift the phase of one of the spectral components with respect to the other spectral components.

* * * * *

UNITED STATES PATENT AND TRADEMARK OFFICE
CERTIFICATE OF CORRECTION

| | | |
|---|---|---|
| PATENT NO. | : 7,729,616 B2 | Page 1 of 1 |
| APPLICATION NO. | : 11/062090 | |
| DATED | : June 1, 2010 | |
| INVENTOR(S) | : Etemad et al. | |

It is certified that error appears in the above-identified patent and that said Letters Patent is hereby corrected as shown below:

In the Drawings

In Fig. 1, Sheet 1 of 10, for Tag "154", in Line 3, delete "CRATE" and insert -- GATE --, therefor.

In the Specification

In Column 3, Line 19, delete "Multitplex" and insert -- Multiplex --, therefor.

In Column 4, Line 18, delete "a a matching" and insert -- a matching --, therefor.

In Column 4, Line 25, delete "an Hadamard" and insert -- a Hadamard --, therefor.

In Column 5, Line 43, delete "modulator 120." and insert -- modulator 122. --, therefor.

In Column 6, Line 13, delete "optical time gate 150." and insert -- optical time gate 154. --, therefor.

Signed and Sealed this
Eleventh Day of November, 2014

Michelle K. Lee
*Deputy Director of the United States Patent and Trademark Office*